United States Patent Office

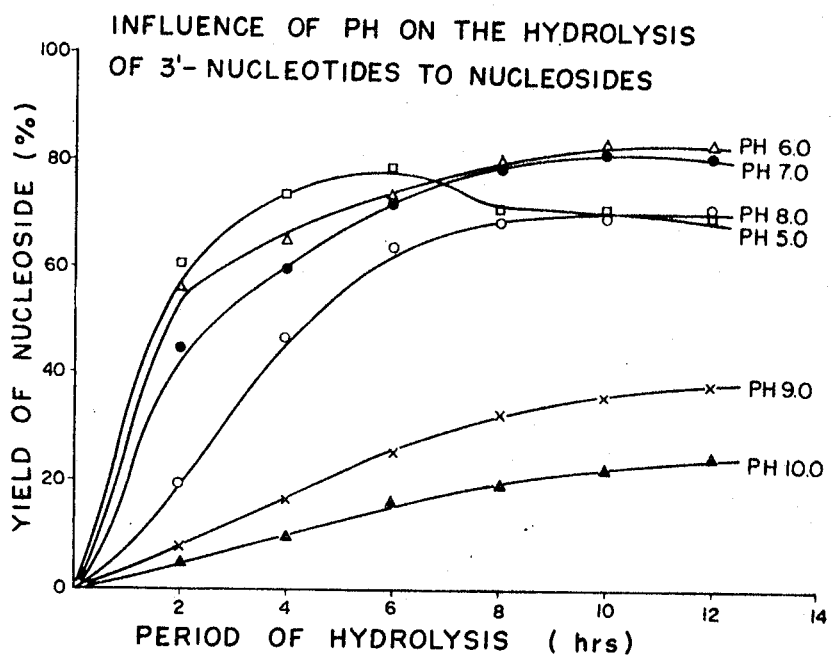

3,457,254
Patented July 22, 1969

3,457,254
PROCESS FOR PREPARING NUCLEOSIDES
Nobumitsu Yano, Masao Fukushima, Terumasa Satou, and Saburo Senoh, Nobeoka-shi, Japan, assignors to Asahi Kasei Kogyo Kabushiki Kaisha, Kita-ku, Osaka, Japan
Filed Oct. 3, 1966, Ser. No. 583,700
Claims priority, application Japan, Oct. 9, 1965, 40/61,605
Int. Cl. C07d 51/50
U.S. Cl. 260—211.5        5 Claims

ABSTRACT OF THE DISCLOSURE

3′-nucleosides may be prepared by adjusting the pH of an aqueous medium containing ribonucleic acid to a pH of 8 to 10, heating the medium at 60° to 150° C. until the pH reaches a value of 5–8.5, maintaining the pH in the range of 5–8.5 while further heating the medium at 100° to 150° C. to produce 3′-nucleosides. If the starting material is 3′-nucleotide or a partial hydrolyzate of ribonucleic acid, the process may start at the point of adjusting the pH to 5–8.5, and thereafter heating at 100°–150° C. to hydrolyze the starting material to 3′-nucleosides.

---

This invention relates to a process for preparing nucleosides advantageously on an industrial scale, and more particularly, it relates to a process for preparing the same by adjusting pH of an aqueous solution of 3′-nucleotide, ribonucleic acid or their partial hydrolyzates, or of biological matters having a high content of ribonucleic acid at a predetermined value and by heat-treating the same thereafter.

Nucleosides which may be obtained in the process of this invention are not only useful as starting materials for the production of nucleic acid derivatives as condiments but also as starting materials for preparing various chemical reagents and medicines.

An object of this invention is to provide a process for preparing nucleosides advantageously on an industrial scale.

It has been heretofore known to prepare nucleosides from partial hydrolyzates of 3′-nucleotides and ribonucleic acid, for example, by using metal compounds such as $Pb(OH)_2$, $Cd(OH)_2$, $Zn(OH)_2$, $Bi(OH)_3$, $Al(OH)_3$ and the like as reported in Annalen der Chemie, 620, 94–108 (1959); metal compounds of rare earth elements; and pyridine as hydrolyzing agents.

Also, there have been known some other processes for preparing nucleosides from ribonucleic acid, however, these processes all without exception require the use of hydrolyzing agents such as magnesium oxide, lanthanum hydroxide, formamide and pyridine.

In order to obtain nucleosides from biological matters, there have been known processes comprising using yeast having a high content of ribonucleic acid as a starting material and extracting high molecular ribonucleic acid with neutral salt such as sodium chloride, or, extracting a low molecular ribonucleic acid with alkaline solution, purifying the extract and hydrolyzing the ribonucleic acid contained therein by hydrolyzing agents such as magnesium oxide, lanthanum hydroxide, formamide, pyridine and the like, to give the desired nucleosides.

Since any of these prior art processes for preparing nucleosides necessitate the use of hydrolyzing agents as described above, they have a number of disadvantages not only in view of the production cost but also in the operation such as separation and purification of the produced nucleosides.

We have, therefore, conducted our study in an attempt to eliminate these disadvantages as mentioned above and have found out that nucleosides may be obtained from 3′-nucleotide, ribonucleic acid or hydrolyzates thereof or biological matters having a high content of ribonucleic acid in high yields by simply adjusting pH of an aqueous solution of these materials as mentioned above without requiring any hydrolyzing agent.

That is, we have found out that nucleosides may be obtained quite simply by adjusting pH of an aqueous solution of these materials at a predetermined value depending upon the type of starting materials used and heat-treating thus pH-adjusted solution until desired nucleosides are produced by hydrolysis, generally for 5–25 hours.

The practical reaction conditions of the process of this invention may be explained more fully in the following:

First of all, the hydrolysis of 3′-nucleotides to nucleosides, which is the most basic embodiment of the present invention, will be explained.

3′-nucleotides which may be used as starting materials in the process include, of course, commercially available nucleotides as well as hydrolyzates obtained from hydrolysis of ribonucleic acid by alkali.

So far as pH of the reaction solution is concerned, it is only necessary to adjust the pH at from 5 to 8.5 at the time of starting the reaction, however, pH of from 5 to 7 is most preferable for a good result.

The accompanying drawing illustrates an influence of pH on the hydrolysis of 3′-nucleotides to nucleosides as measured according to the following manner:

Commercially available ribonucleic acid was hydrolyzed at a temperature of from 80° to 100° C. in an aqueous alkaline solution having pH of 9.5 for one hour and the resulting mixture containing 3′-nucleotide was allowed to pass through active carbon thereby adsorbing 3′-nucleotides which, in turn, was eluted with methanol solution of alkali. The eluent was concentrated to give purified 3′-nucleotide solution. Then, 500 ml. of said solution were adjusted to have pH within a range of 5–10, and the variation in the formation of nucleosides was traced as the lapse of time, while the reaction temperature was maintained at 130° C. in an autoclave.

As illustrated in said drawing, pH which is lower than 5 results in the decrease of the formation of the desired nucleosides after about 6 hours from the start of reaction, due to the over-hydrolysis of nucleosides to ribose and nucleic bases, thus, it is undesirable. On the other hand, pH which is more than 10 causes a great delay in the formation of nucleosides as can be clearly noted from the drawing.

Alkalis which may be used to adjust pH in the process include preferably NaOH, KOH, and $NH_4OH$, and acids which may be used for the same purpose include preferably mineral acids such as hydrochloric acid, sulfuric acid, etc.

As far as the reaction temperature and the reaction period in the process are concerned, the temperature below 100° C. requires a prolonged reaction period, and the temperature exceeding 150° C. causes over-hydrolysis which in turn leads to the decrease in the reaction yield, although such higher temperature may shorten the reaction period. Thus, a reaction temperature of from 100° to 150° C. is preferable. In general, a reaction period of from 5 to 8 hours at a reaction temperature of 130°±5° C. affords the desired nucleosides in a high yield. However, since the course of reaction varies somewhat depending upon the composition of the reaction solution, it may be advisable to determine the end point of the reaction by tracing the ratio of inorganic phosphorus to total phosphorus as the lapse of time until the ratio reaches at the point of from 0.9 to 0.95.

The separation of nucleosides thus obtained may be carried out in the conventional method, fo example, by cooling the hydrolyzate obtained in the above as such, filtering the precipitate deposited, washing the same with a small amount of methyl alcohol and further recrystallizing the product from a hot water to give needle-like crystal of guanosine.

On the other hand, to the filtrate are added a solution of cupric sulfate and sodium bisulfate to give a precipitate of adenosine cupric salt. The adenosine cupric salt thus obtained is then collected by filtering and dissolved in aqueous ammonia. The resulting solution is allowed to pass through a cation ion exchange resin, for example, Amberlite IR–50 (H+ form), to remove copper therefrom, and the effluent is concentrated and cooled to give a crystal of adenosine.

In the foregoing, the basic reaction of the process of this invention, i.e. a process for preparing nucleosides from 3′-nucleotide, is explained in detail.

It has now been found out that the basic reaction described above may be applicable to a process for preparing nucleosides from ribonucleic acid or biological matter having a high content of the same as starting materials.

First, a process wherein ribonucleic acid is used as a starting material will be explained in the following:

Although it is well known that ribonucleic acid is hydrolyzed to nucleotide in an alkaline solution, the process of this invention enables the hydrolysis of ribonucleic acid straight to nucleoside by a simple adjustment of pH alone and, in this respect, the present process is entirely unique as compared with the prior methods.

In preparing nucleosides from ribonucleic acid as a starting material according to the process of this invention, said material is suspended in the same or 2–3 times amount of water and the mixture is adjusted to a pH of 8–10 and then heated at a temperature of from 60° to 150° C. for a period of from 10 minutes to 1 hour. By so doing, ribonucleic acid is hydrolyzed to 3′-nucleotide and the pH turns to 5–8.5. When heating is continued at a temperature of from 100° to 150° C. further at this point, the basic reaction explained in the above is proceeded to give the desired nucleoside. That is, according to the process, nucleoside may be obtained in a high yield by simply adjusting pH of an aqueous solution of ribonucleic acid at 8–10, and subjecting the resulting solution to a heat treatment for 6–9 hours. Both commercially available ribonucleic acid and ones separated from biological matters by extraction are conveniently used as starting materials in this process.

pH adjusting agents which may be used in the process include alkalis such as NH$_4$OH, NaOH, and KOH, and acids such as mineral acids.

The mixture containing nucleoside obtained by hydrolysis may be treated in the conventional manner as described above to give guanosine and adenosine in the form of crystal.

Next, a process wherein biological matters having a high content of ribonucleic acid is used as a starting material will be explained in the following:

In general, the procedures are substantially similar to the case in which ribonucleic acid is used as a starting material.

That is, pH of a suspension of biological matter is adjusted at 10–13 and heated at a temperature of from 60° to 150° C. By so doing, an initial hydrolysis of ribonucleic acid takes place subsequently to the extraction of the same from the starting biological matters, and ribonucleic acid contained in the biological matter is hydrolyzed to 3′-nucletotide and pH of said solution is decreased to just about 5–8.5 due to the liberation of phosphoric acid.

If pH of said solution deviates from the range of 5–8.5 as mentioned above, it may be readjusted within the range by adding adjusting agent to maintain the required pH value. When the solution of which pH is thus maintained within the range of 5–8.5 is further heated at a temperature of from 100° to 150° C., the basic hydrolysis reaction of the process of this invention is proceeded to give the desired nucleosides.

The concentration of biological matters which may be used as a starting material in the process varies depending upon the kinds of the material. However, in general, the concentration of from 10 to 25% w./v. is preferable.

Biological matters which may be used as starting material in the process include various microorganisms in addition to yeast.

Alkalis such as NH$_4$OH, NaOH and KOH; and acids such as mineral acids are also used as pH adjusting agents in this instance.

In this particular process, the procedures for separating the resulting nucleosides from the reaction mixture after the completion of reaction differ from those of a process using ribonucleic acid as a starting material in that an additional operation to separate the cells is required. That is, after the completion of reaction, the reaction mixture is cooled and the pH is adjusted at 3–4, then, cells are separated by a centrifuge. At this point, it is essential to wash the separated cells sufficiently. Since most of the produced nucleosides are transferred to the supernatant and washings, the separation of the product may be carried out in the conventional methods thereafter. Such conventional methods include, for example, the separation of four ingredients of the produced nucleosides, i.e. guanosine, adenosine, cytidine and uridine, by an ion exchange resin; the separation of purine nucleosides as cupric salt by the addition of a solution of cupric sulfate and sodium bisulfate; and the like.

As noted above, in accordance with this invention, there are provided processes for preparing nucleosides from 3′-nucleotide or a partial hydrolyzate of ribonucleic acid by adjusting the pH at 5–8.5 and thermally hydrolyzing these materials at a temperature of from 100° to 150° C. Further in accordance with this invention, there is also provided a process which enables the hydrolysis of ribonucleic acid or biological matters having a high content of the same straight to the corresponding nucleosides by adjusting suitably the pH and a temperature condition according to the basic reaction of this invention, thereby obtaining nucleoside quite easily without requiring any hydrolyzing agent.

The advantages of the process of this invention may be explained practically in the following:

First, in reference to the cost of hydrolyzing agents which are not required in the process of this invention, the prior art processes using formamide as a hydrolyzing agent require the same in an amount of 5–10 times by weight based on the weight of produced adenosine or guanosine. Thus, by eliminating such cost, the cost of product may be reduced by $3.00 to $5.00 per kilogram of adenosine or guanosine.

Next, from the operational point of view, in prior art processes using formamide as a hydrolyzing agent, a greater amount of an ion exchange resin is required in the isolation and purification of nucleoside, due to the fact that formamide is converted to ammonium formate in the course of the hydrolysis reaction. Also, in the separation according to copper-salt method, the presence of formamide hinders copper-salt forming reaction and not only leads to the decrease in the isolation and purification yield but also complicates the operations.

Whereas, in the process of this invention, the isolation and purification of the product are quite easy due to the fact that hydrolyzate obtained in this process has a simple composition and this is quite advantageous from an industrial point of view. Particularly, when biological matters are used as the starting material, the desired nucleoside can be obtained from the cells in a one-step operation without requiring any special extracting operation and further the operations involved are greatly simplified.

The following examples will serve to illustrate the process of this invention more in detail. However, it should

Example 1

In 500 ml. of water were dissolved 100 g. of monosodium salt of ribonucleic acid containing 7.5% of organic phosphorus and pH of the resulting solution was adjusted at 9.5 by adding sodium hydroxide, and the solution was heated at 145° C. for 5 hours in an autoclave provided with a stirrer. The resulting hydrolyzate was allowed to stand overnight in a cool place and the precipitates deposited were collected by filtering, and washed with 100 ml. of methyl alcohol, then, recrystallized twice from hot water to give 15.2 g. of needle-like crystal of guanosine having a M.P. of 232°–234° C.

To the filtrate was added 200 ml. of 30% solution of cupric sulfate and after heated at 70° C., 65 ml. of 30% solution of sodium bisulfate was added slowly thereto and allowed to stand to cool. The precipitate of adenosine cuprous salt deposited was collected by filtering, washed sufficiently with water, then dissolved in 500 ml. of 14% ammonia solution and the resulting solution was allowed to pass through Amberlite IRC–50, H+ form, to remove copper therefrom.

After the resulting solution containing no copper was concentrated and the liberated ammonia was recovered, the solution was decoloured by adding 3 g. of active carbon and the resulting solution was concentrated to about 50 ml. and the resulting concentrated solution was allowed to stand to cool. The precipitate deposited was collected by filtering to afford 14.07 g. of adenosine having a M.P. of 213° to 215° C.

Example 2

In 500 ml. of water were dissolved 100 g. of monosodium salt of ribonucleic acid containing 7.5% of organic phosphorus and pH of the resulting aqueous solution was adjusted at 9.6 by adding potassium hydroxide. The resulting solution was hydrolyzed under reflux for 20 hours and the hydrolyzate was treated according to the same procedures as in Example 1 to give 15.4 g. of guanosine and 14.5 g. of adenosine.

Example 3

In 500 ml. of water were dissolved 100 g. of monosodium salt of ribonucleic acid containing 7.5% of orgranic phosphorus and pH of the resulting aqueous solution was adjusted at 9.6 by adding potassium hydroxide. The resulting solution was hydrolyzed at 130° C. for 8 hours and the hydrolyzate was treated according to the same procedures as in Example 1 to give 16.3 g. of guanosine and 15.1 g. of adenosine.

Example 4

In 250 ml. of water were dissolved 100 g. of monosodium salt of ribonucleic acid containing 7.5% of organic phosphorus and pH of the resulting aqueous solution was adjusted at 9.8 by adding aqueous ammonia. The resulting solution was hydrolyzed in an autoclave provided with a stirrer at 130° C. for 8 hours. The hydrolyzate was treated according to the same procedures as in Example 1 to give 15.2 g. of needle-like crystalline guanosine.

The filtrate was allowed to pass through ion exchange resin, Amberlite IR–200, H+ form, and the adsorbed uridine was eluted with water.

The eluent was concentrated to a volume of 20 ml. To the concentrated solution was then added 10 times by weight of methyl alcohol and the resulting mixture was allowed to stand to cool. The precipitate deposited was collected by filtering to afford 12.3 g. of uridine. The uridine was recrystallized from 50% methyl alcohol to obtain pure uridine having a M.P. of 162°–164° C.

On the other hand, adenosine and cytidine adsorbed on the above-mentioned Amberlite IR–200, H+ form, were eluted with ammonia and the eluent was allowed to pass through Amberlite IRA–900, OH− form, and adenosine and cytidine adsorbed thereto were separated respectively with water and ammonium chloride solution chromatographically. To each respective eluent which was concentrated to a volume of about 200 ml. was added the same amount of methyl alcohol. The deposited crystals were collected by filtering to afford 4.5 g. of cytidine having a M.P. of 220° to 225° C., and 12.6 g. of adenosine having a M.P. of 230°–232° C., respectively.

Example 5

In 100 ml. of water were dissolved 100 g. of monosodium salt of ribonucleic acid containing 7.5% of organic phosphorus were dissolved and pH of the resulting aqueous solution was adjusted at 9.5 by adding sodium hydroxide and the resulting solution was hydrolyzed at 90° C. for 1 hour.

It has been confirmed by Uvicord and electrophoresis analysis that ribonucleic acid was hydrolyzed quantitatively to 3′-nucleotide.

The hydrolyzate, of which pH was 6.2, was further hydrolyzed in an autoclave provided with a stirrer at 130° C. for 6 hours, and, thereafter, treated according to the same procedures as in Example 1 to give 15.4 g. of guanosine and 14.2 g. of adenosine.

Example 6

In 500 ml. of water were dissolved 100 g. of monosodium salt of ribonucleic acid containing 7.5% of organic phosphorus and pH of the resulting aqueous solution was adjusted at 9.8 by adding potassium hydroxide. The resulting solution was hydrolyzed at 90° C. for 1 hour to give hydrolyzate having pH of 6.3. The hydrolyzate was further hydrolyzed at 130° C. for another 6 hours, and, thereafter, treated according to the same procedures as in Example 1 to give 14.6 g. of guanosine and 13.8 g. of adenosine.

Example 7

In 300 ml. of water were dissolved 100 g. of monosodium salt of ribonucleic acid containing 7.5% of organic phosphorus and pH of the resulting aqueous solution was adjusted at 9.0 by adding aqueous ammonia and the resulting solution was hydrolyzed at 90° C. for 1 hour to give hydrolyzate having pH of 5.8. The hydrolyzate was further hydrolyzed at 140° C. for another 5 hours, and thereafter, treated according to the same procedures as in Example 1 to give 14.2 g. of guanosine and 13.8 g. of adenosine.

Example 8

In 200 ml. of water were dissolved 100 g. of monosodium salt of ribonucleic acid containing 7.5% of organic phosphorus and pH of the resulting aqueous solution was adjusted at 9.3 by adding sodium hydroxide and the resulting solution was hydrolyzed at 80° C. for 1 hour to give hydrolyzate having pH of 6.2. The hydrolyzate was further hydrolyzed for another 20 hours under reflux, and, thereafter, treated according to the same procedures as in Example 1 to give 15.8 g. of guanosine and 14.5 g. of adenosine.

Example 9

In 20 liters of water were suspended 3 kgs. of commercially available yeast containing 7.3% of ribonucleic acid as measured by Schmidt and Thanhauser method and pH of the resulting mixture was adjusted at 12 by adding aqueous ammonia, and the resulting mixture was treated in an autoclave provided with a stirrer at 130° C. for 5 hours. Then, pH of the treated solution was adjusted at 3.5–4, and after the cells were removed by centrifuge and washed well with water, the obtained supernatant and the washings were combined together and allowed to pass through Amberlite 200, H+ form, thereby adsorbing nucleosides other than uridine. After pH of uridine solution as the effluent was adjusted at above 10, it was allowed to pass through an ion exchange resin Amberlite IRA–168, OH⁻ form, to adsorb uridine which was then eluted with water. The eluent was concentrated to a volume of about 50 ml. and methanol in an amount of 10 times by weight was added thereto, and the resulting mixture was allowed to stand to cool. The deposited crystals were collected by filtering to afford 34.8 g. of crystalline uridine. The crystalline uridine was recrystallized from methanol to give pure uridine having a M.P. of 162°–164° C.

On the other hand, guanosine, adenosine and cytidine which were adsorbed on the above-mentioned Amberlite-200, H⁺ form, were eluted with aqueous ammonia, and the eluent was allowed to pass through Amberlite IRA–900, OH⁻ form, and washed sufficiently with water thereby eluting adenosine and cytidine, and only guanosine remained adsorbed. The eluent containing adenosine and cytidine was concentrated to a volume of 200 ml. and 30.4 g. of crystal deposited were collected by filtering. The crystals were recrystallized from water twice to give pure adenosine having a M.P. of 227°–230° C.

To the filtrate was added the same amount of methanol, and the mixture was allowed to stand in a cool place. The deposited crystals were collected by filtering to give 15.8 g. of crude cytidine containing a trace of adenosine.

The crude cytidine thus obtained was treated with Amberlite IRA–900, OH⁻ form, to give crystal of pure cytidine having a M.P. of 220°–223° C.

Guanosine which was adsorbed on the Amberlite IRA–900, OH⁻ form, in the above was eluted with ammonium chloride and the eluent was concentrated. To the concentrated solution was added methanol, and the deposited crystals were collected by filtering and recrystallized from a hot water twice to give 38.2 g. of crystalline guanosine having a M.P. of 230°–233° C.

Example 10

In 20 liters of water were suspended 3 kgs. of commercially available yeast containing 7.3% of ribonucleic acid as measured by Schmidt and Thanhauser method, and pH of the resulting mixture was adjusted at 11.5 by adding sodium hydroxide and the mixture was heat-treated for 24 hours under reflux. The reaction mixture was treated according to the same procedures as in Example 9 and 32.5 g. of uridine, 30.2 g. of adenosine, 10.6 g. of cytidine and 33.8 g. of guanosine were obtained.

Example 11

In 20 liters of water were suspended 3 kgs. of commercially available yeast containing 7.3% or ribonucleic acid as measured by Schmidt and Thanhauser method, and pH of the resulting mixture was adjusted at 12.5 by adding potassium hydroxide. The reaction mixture was treated according to the same procedures as in Example 9 and 31.8 g. of uridine, 30.5 g. of adenosine, 5.8 g. of cytidine and 34 g. of guanosine were obtained.

Example 12

In 20 liters of water were suspended 3 kgs. of commercially available yeast containing 7.3% or ribonucleic acid as measured by Schmidt and Thanhauser method, and pH of the resulting mixture was adjusted at 11.0 by adding sodium hydroxide.

The reaction mixture was treated at 90° C. for 1 hour and after pH of the reaction mixture reached at 6.5, further treated at 130° C. for another 5 hours. By following the same procedures as in Example 9, 26.3 g. of uridine, 31.5 g. of adenosine, 13.6 g. of cytidine and 35.2 g. of guanosine were obtained.

Example 13

In 500 ml. of 0.5 N aqueous sodium hydroxide were dissolved 100 g. of monosodium salt of ribonucleic acid containing 7.5% of organic phosphorus and the reaction mixture was hydrolyzed for 1 hour under reflux. After pH of the hydrolyzate solution was adjusted at 1.5 by adding 10 N–HCl, the solution was allowed to pass through a column filled with 1 kg., or about 20 liters, of active carbon which is commercially available, and 3′ - nucleotides contained in the hydrolyzate solution were adsorbed completely.

After washing the active carbon column sufficiently with water, adsorbed 3′-nucleotides were eluted with 40 liters of 1.5 N–NH₄OH—10% methanol solution. The eluent was analyzed by electrophoresis method and the following compounds were confirmed as 3′-nucleotides:

| | mM. |
|---|---|
| 3′-guanosine monophosphate | 67 |
| 3′-adenosine monophosphate | 62 |
| 3′-uridine monophosphate | 69 |
| 3′-cytidine monophosphate | 53 |

After the above eluent was concentrated to a volume of about 500 ml., and pH was adjusted at 6.5 by adding sodium hydroxide, the reaction mixture was hydrolyzed at 140° C. for 6 hours in an autoclave provided with a stirrer. By following the same procedure as described in Example 4, thereafter, 14.8 g. of guanosine, 11.8 g. of uridine, 12.6 g. of adenosine and 6.2 g. of cytidine were obtained.

Example 14

With 500 ml. of 0.5 N–NaOH were treated 100 g. of monosodium salt of ribonucleic acid containing 7.5% of organic phosphorus as described in Example 13, and the resulting mixture containing 3′-nucleotides were concentrated to a volume of about 500 ml. After pH of the concentrated mixture was adjusted at 6.8 by adding aqueous ammonia, the reaction mixture was hydrolyzed at 120° C. for 12 hours in an autoclave provided with a stirrer. By following the same procedures as described in Example 4, 13.6 g. of guanosine, 10.5 g. of uridine, 13.0 g. of adenosine and 5.8 g. of cytidine were obtained.

Example 15

In 500 ml. of 0.5 N–KOH were dissolved 100 g. of monosodium salt of ribonucleic acid containing 7.5% of organic phosphorus and the resulting mixture was hydrolyzed at 85° C. for 1 hour.

The hydrolyzate solution was treated according to the same procedures as described in Example 13 and about 40 liters of a mixture solution containing 3′-nucleotide was obtained. The analysis of said mixture solution by electrophoresis method confirmed the presence of the following compounds as 3′-nucleotides:

| | mM. |
|---|---|
| 3′-guanosine monophosphate | 65 |
| 3′-adenosine monophosphate | 60 |
| 3′-uridine monophosphate | 91 |
| 3′-cytidine monophosphate | 50 |

After the above solution was concentrated to a volume of about 500 ml. and pH thereof was adjusted at 6.0 by potassium hydroxide, the reaction mixture was hydrolyzed at 130° C. for 8 hours. By following the same procedures as described in Example 14 thereafter, 15.1 g. of guanosine, 10.6 g. of uridine, 12.3 g. of adenosine and 6.0 g. of cytidine were obtained.

What we claim is:

1. A process for preparing nucleosides which comprises adjusting the pH of an aqueous solution of a member selected from the group consisting of a 3′-nucleotide and a partial hydrolyzate of ribonucleic acid to a pH of 5 to 8.5 by the addition of a pH adjusting member selected from the group consisting of alkali hydroxides and mineral acids, and heating said aqueous solution at a temperature of 100° to 150° C. to hydrolyze said member to the corresponding nucleoside, and recovering said nucleoside from the resulting reaction mixture.

2. A process according to claim 1, wherein said alkali hydroxide is selected from the group consisting of ammonium hydroxide, sodium hydroxide and potassium hydroxide, and wherein said mineral acid is selected from the group consisting of hydrochloric acid and sulfuric acid.

3. A process for preparing nucleosides which comprises adjusting the pH of an aqueous medium containing ribonucleic acid to a pH of 8 to 10 by the addition of a pH adjusting agent selected from the group consisting of alkali hydroxides and mineral acids, heating said aqueous medium at 60° to 150° C. until the pH reaches a value within the range of 5 to 8.5, and heating said aqueous medium at a temperature from 100° to 150° C. while maintaining the pH in the range of 5 to 8.5 to produce a nucleoside product, and recovering said nucleoside product from the resulting mixture.

4. A process according to claim 3, wherein said aqueous medium consists essentially of water and ribonucleic acid.

5. A process for producing nucleosides which comprises adjusting the pH of a suspension of biological matter having a high content of ribonucleic acid to a pH of 10 to 13 by the addition of a pH adjusting agent selected from the group consisting of alkali hydroxides and mineral acids, heating the suspension at a temperature of 60° to 150° C. until the pH reaches a value within the range of 5 to 8.5, and further heating said suspension at a temperature of 100° to 150° C. while maintaining the pH in the range of 5 to 8.5 to produce a nucleoside product, and recovering said nucleoside product from the resulting reaction mixture.

References Cited
UNITED STATES PATENTS

| | | | |
|---|---|---|---|
| 2,152,662 | 4/1939 | Phelps | 260—211.5 |
| 2,415,826 | 2/1947 | Laufer et al. | 260—211.5 |
| 3,287,232 | 11/1966 | Mitsugi et al. | 260—211.5 |
| 3,296,087 | 1/1967 | Mitsugi et al. | 260—211.5 |
| 2,698,844 | 1/1955 | Dimroth et al. | 260—211.5 |

LEWIS GOTTS, Primary Examiner

JOHNNIE R. BROWN, Assistant Examiner